United States Patent
Chirol et al.

(10) Patent No.: US 9,845,194 B2
(45) Date of Patent: Dec. 19, 2017

(54) METHOD OF HANDLING PARCELS BY USING SHUTTLE CARTS, NESTING RACKS, AND LIFT TROLLEYS HAVING TRAYS

(71) Applicant: SOLYSTIC, Bagneux (FR)

(72) Inventors: Luc Chirol, Paris (FR); Emmanuel Miette, Saint Gratien (FR)

(73) Assignee: SOLYSTIC, Bagneux (FR)

( * ) Notice: Subject to any disclaimer, the term of this patent is extended or adjusted under 35 U.S.C. 154(b) by 0 days.

(21) Appl. No.: 15/409,563

(22) Filed: Jan. 19, 2017

(65) Prior Publication Data

US 2017/0129705 A1    May 11, 2017

Related U.S. Application Data

(63) Continuation of application No. PCT/FR2016/051576, filed on Jun. 27, 2016.

(30) Foreign Application Priority Data

Aug. 5, 2015 (FR) ...................... 15 57559

(51) Int. Cl.
G06F 7/00 (2006.01)
B65G 1/137 (2006.01)
G06Q 10/08 (2012.01)

(52) U.S. Cl.
CPC .......... *B65G 1/137* (2013.01); *G06Q 10/087* (2013.01); *G05D 2201/0216* (2013.01)

(58) Field of Classification Search
None
See application file for complete search history.

(56) References Cited

U.S. PATENT DOCUMENTS 6,325,586 B1 * 12/2001 Loy .................. B65G 1/02
                                                    414/281
8,721,251 B1 *  5/2014 Razumov ........... B65G 1/0407
                                                    108/144.11
(Continued)

FOREIGN PATENT DOCUMENTS

FR      2996788 A1   4/2014
JP      H0867498 A   3/1996
(Continued)

OTHER PUBLICATIONS

International Search Report in corresponding International Patent Application No. PCT/FR2016/051576, dated Oct. 10, 2016, with English Translation.
(Continued)

*Primary Examiner* — Yolanda Cumbess
(74) *Attorney, Agent, or Firm* — Edell, Shapiro & Finnan, LLC

(57) ABSTRACT

A method of handling articles in a logistics center uses an unloading zone for unloading the articles arriving at the center and an article stowage zone where the articles are stored in ordered manner, nesting racks coupled to shuttle robot carts, and also trays placed on lift trolleys coupled to the shuttle robot carts, and at least one vertical tray rack for storing the trays loaded with the articles in superposed manner in the stowage zone. If an article is loaded on a nesting rack in the unloading zone, the shuttle robot cart stores the article with the nesting rack in a lower portion of the tray rack.

7 Claims, 6 Drawing Sheets

(56) References Cited

U.S. PATENT DOCUMENTS

| | | | |
|---|---|---|---|
| 8,972,045 B1 | 3/2015 | Mountz et al. | |
| 9,073,736 B1 | 7/2015 | Hussain et al. | |
| 9,665,095 B1* | 5/2017 | Romano | G05D 1/0038 |
| 2004/0093650 A1 | 5/2004 | Martins et al. | |
| 2014/0056672 A1* | 2/2014 | Mathys | B65G 1/0407 |
| | | | 414/277 |
| 2014/0214195 A1* | 7/2014 | Worsley | G05D 1/0287 |
| | | | 700/217 |
| 2015/0073589 A1* | 3/2015 | Khodl | B25J 5/007 |
| | | | 700/218 |
| 2015/0127143 A1* | 5/2015 | Lindbo | B65G 1/0464 |
| | | | 700/218 |
| 2016/0107838 A1* | 4/2016 | Swinkels | B66F 9/063 |
| | | | 414/273 |

FOREIGN PATENT DOCUMENTS

| | | |
|---|---|---|
| WO | 2013102212 A1 | 7/2013 |
| WO | 2013135227 A1 | 9/2013 |
| WO | 2015052830 A1 | 4/2015 |

OTHER PUBLICATIONS

French Search Report in corresponding French Patent Application No. 1557559, dated Jun. 7, 2016, 2016.

* cited by examiner

METHOD OF HANDLING PARCELS BY USING SHUTTLE CARTS, NESTING RACKS, AND LIFT TROLLEYS HAVING TRAYS

CROSS-REFERENCE TO RELATED APPLICATIONS

This application is a continuation of International Application No. PCT/FR2016/051576, filed on Jun. 27, 2016, which claims priority under 35 U.S.C. §119 to Application No. FR 1557559, filed on Aug. 5, 2015, the contents of which are incorporated by reference herein in their entirety.

TECHNICAL FIELD

The invention relates to handling articles in a logistics center, and in particular handling parcels in a parcel sorting logistics center having an unloading zone for unloading the parcels arriving at the center and a parcel stowage zone where the parcels arriving at the center are stored in mutually ordered manner with a view to them leaving the center in an order following a certain sequence, e.g. for them to be delivered by a delivery person.

BACKGROUND ART

A method of handling parcels in a parcel sorting logistics center is disclosed in Patent FR 2 996 788.

In that method, the parcels are moved from the unloading zone to a stowage zone using nesting-type racks on legs, which nesting racks are coupled to shuttle robot carts and are of different formats (heights and widths) so that they are suitable for nesting together by being superposed on one another.

A plurality of nesting racks, each of which is loaded with one parcel can thus be superposed on a segment of the stowage zone, and, as a result, the segment of the stowage zone extends heightwise while occupying only a small footprint on the floor.

SUMMARY OF THE INVENTION

An object of the invention is to make the heightwise storage of the parcels in the stowage zone even denser so as to sort even more parcels at a parcel sorting logistics center.

To this end, the invention provides a method of handling articles in a logistics center having an unloading zone for unloading the articles arriving at the center and an article stowage zone where the articles arriving at the center are stored in mutually ordered manner with a view to them leaving the center in order following a certain sequence, which method consists in moving the articles from the unloading zone to the stowage zone with nesting racks coupled to shuttle robot carts, said method being characterized in that it also uses trays placed on lift trolleys coupled to the shuttle robot carts for moving the articles from the unloading zone to the stowage zone, and at least one vertical tray rack for storing the trays loaded with the articles in superposed manner in the stowage zone, in that if an article is loaded on a nesting rack in the unloading zone, the shuttle robot cart stores the article with the nesting rack in a lower portion of the tray rack, and if an article is loaded on a tray placed on a lift trolley, the shuttle robot cart stores the article with the tray above the nesting rack in an upper portion of the tray rack that is provided with horizontal runners.

The method of the invention may have the following features:

the lift trolleys are actuated by shuttle robot carts in such a manner as to position the trays dynamically and heightwise in the tray rack so as to minimize the empty space between two consecutive trays; and a plurality of tray racks are used that are disposed in one or more rows in the stowage zone.

The invention also provides a logistics center for handling parcels, which logistics center comprises a loading/unloading point for loading/unloading the parcels and a stowage zone that is designed for receiving parcels waiting for loading, and that is subdivided into various segments, each of which corresponds to a shipment of said parcels, and racks on legs of the nesting type and of different formats (heights and widths) suitable for nesting by being superposed on one another, and independently self-propelled motor-driven shuttle carts suitable for docking with each rack under the control of a central processing unit, said logistics center being characterized in that it further comprises lift trolleys for carrying trays and suitable for being docked with the shuttle carts, and one or more tray racks in which nesting racks loaded with parcels are stored in the lower portion and trays loaded with parcels are stored in the upper portion, above the nesting racks.

In particular, the tray rack(s) are wheeled, and the wheeled tray rack(s) are arranged to be docked with and moved by a shuttle cart. Naturally, the invention may extend to articles other than parcels, such as baggage or the like.

DESCRIPTION OF IMPLEMENTATIONS

The invention relates generally to a method of handling articles that are, more particularly in this example, postal parcels to be sorted in a postal sorting logistics center for sorting parcels.

Without going beyond the ambit of the invention, the articles may be baggage and the logistics center may be a place for organizing loading of baggage onto an airplane, for example.

The articles could also be the result of preparing outward orders from a logistics depot, and the center could be a place designed for shipping the orders.

The following description is focused non-limitingly on handling postal parcels in a postal sorting logistics center 1.

Figure 1:
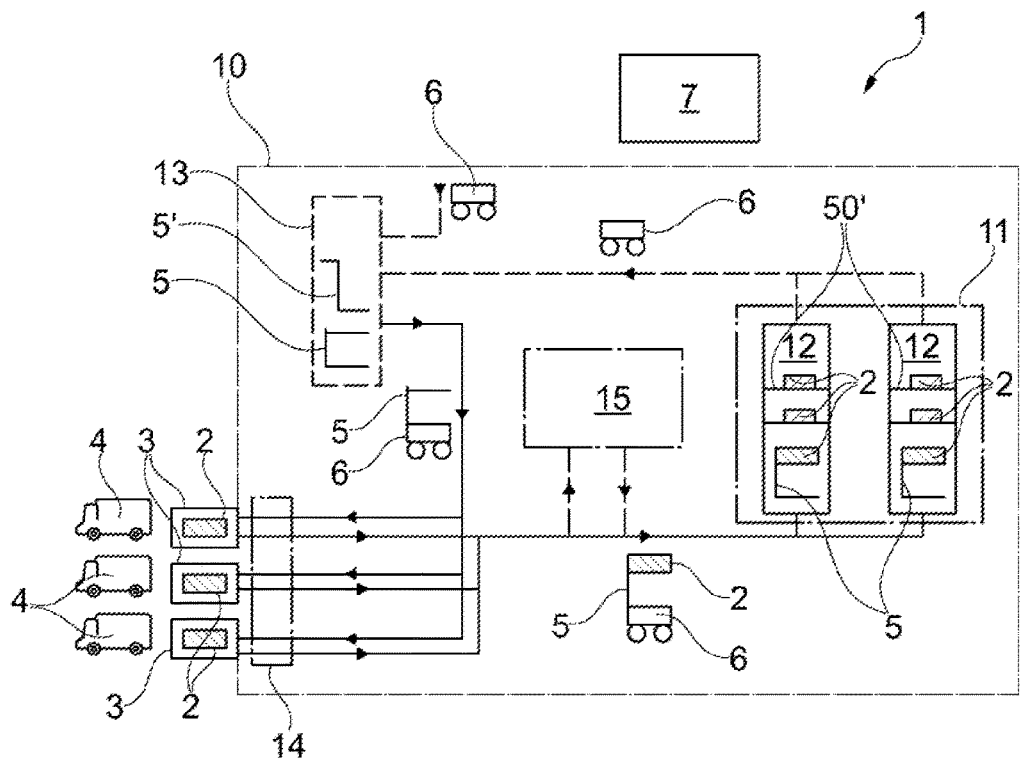
FIG. 1 is a highly diagrammatic view of a parcel sorting logistics center with shuttle robot carts, nesting racks, and lift trolleys for transferring the parcels from an unloading point to a stowage zone.
Figure 2:
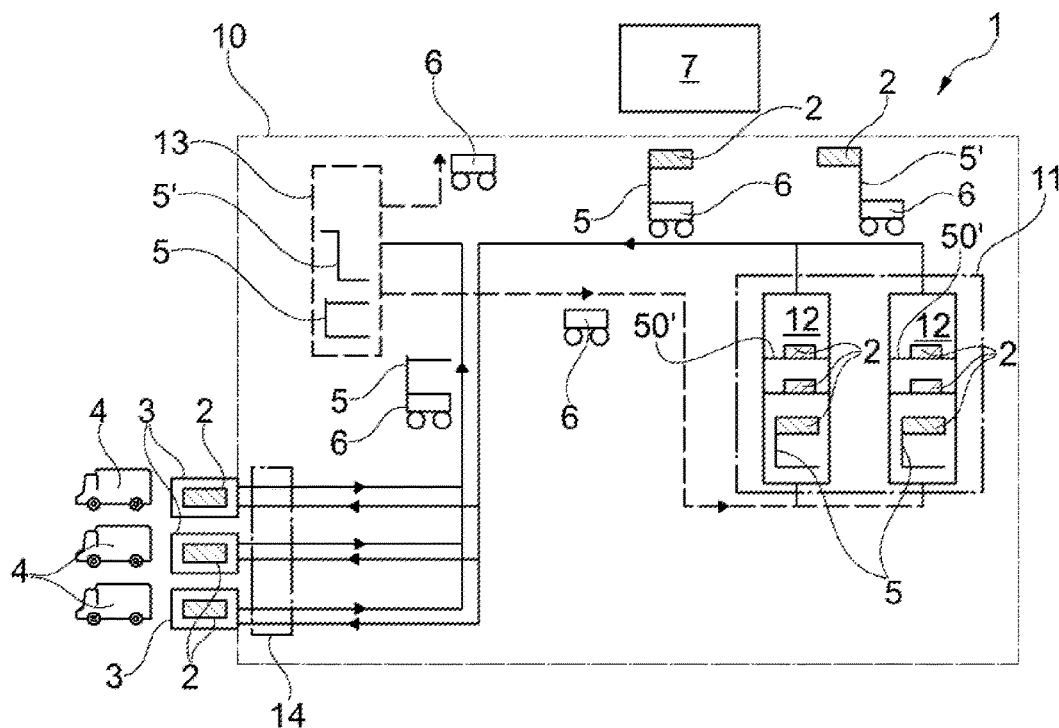
FIG. 2 is a highly diagrammatic view of the logistics center with the shuttle robot carts, the nesting racks, and the lift trolleys for moving the parcels from the stowage zone to the loading point.

The logistics center 1 shown in FIGS. 1 and 2 has a platform 10 provided with unloading and loading points 3 for unloading and loading the parcels 2, which points are accessible to transport means, such as, for example, trucks 4 for bringing the parcels 2 and for taking them away.

In the example shown, there are three unloading points 3 disposed side-by-side, each combined with a loading point 3.

Naturally, the unloading points 3 may be dissociated from the loading points 3, and/or there may be a larger number of them, and/or they may be disposed in a configuration other than the configuration shown.

In particular, the platform 10 includes a stowage zone 11 designed to receive parcels 2 that are unloaded and that are waiting to be loaded.

This stowage zone 11 is subdivided into a plurality of segments 12, and into two segments 12 in the example shown in FIGS. 1 and 2.

In accordance with the invention, nesting-type racks 5, lift trolleys 5' having trays, and shuttle robot carts 6 are used to move the parcels from the unloading point 3 to the stowage zone 11.

Figure 9:
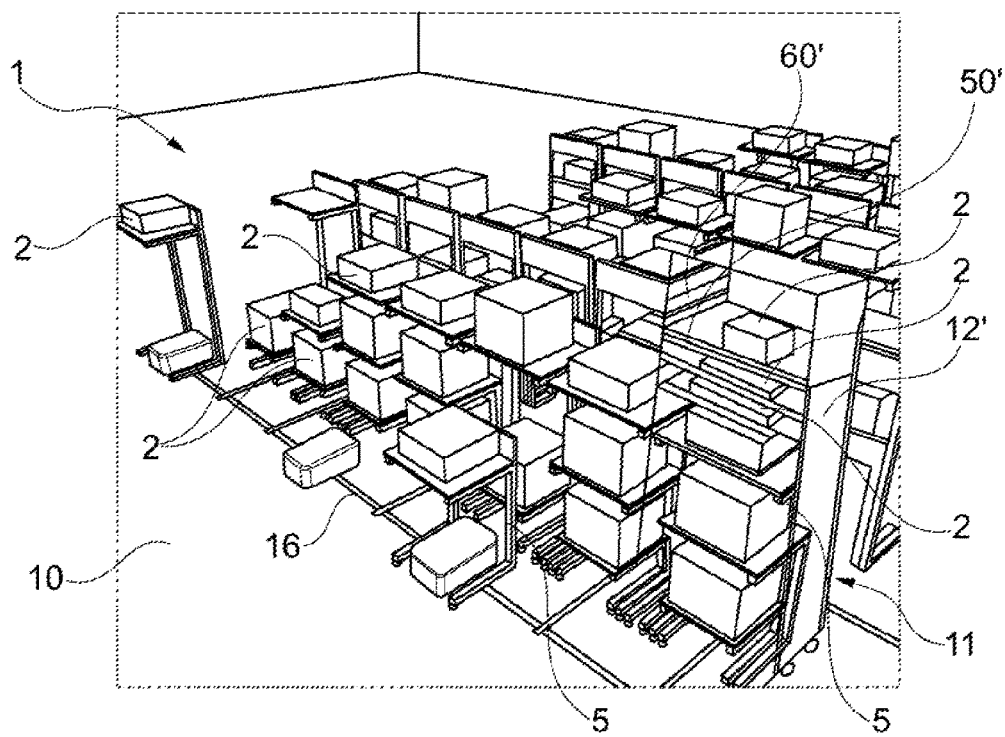
FIGS. 9 and 10 show the stowage zone with nesting racks in the lower portion of tray racks.
Figure 10:
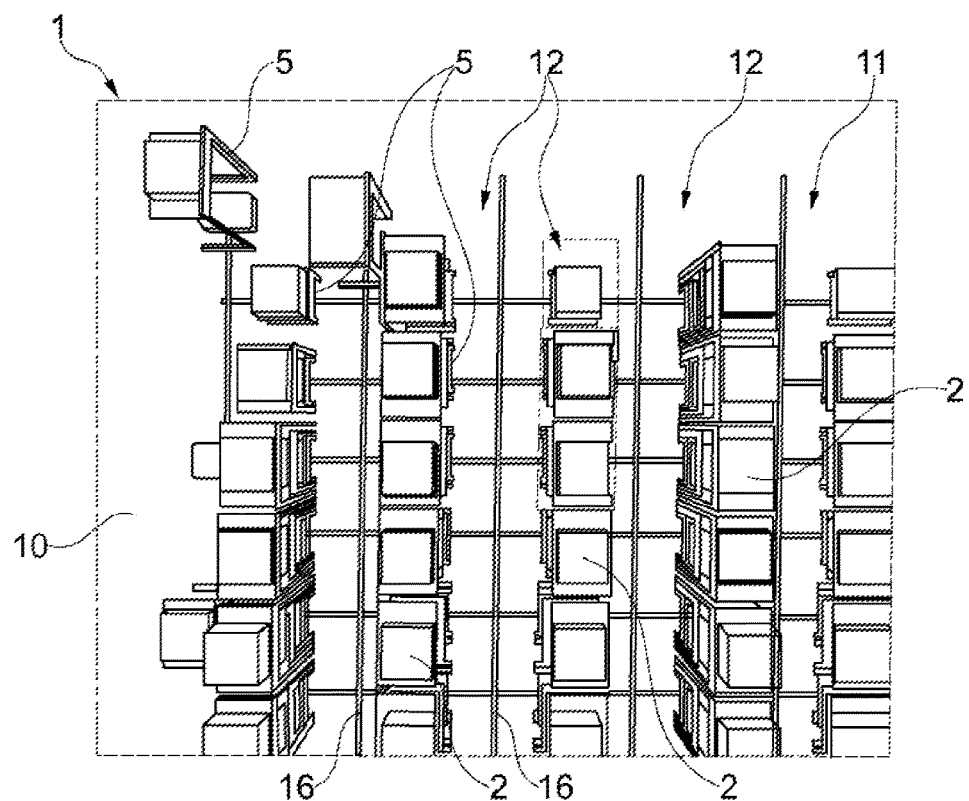

In addition, the trays 50' provided for the lift trolleys 5' are stored in one or more tray racks as shown in FIG. 9.

The center 1 of the invention includes a parking zone 13 in which empty racks 5 are stored. The zone 13 also serves to store lift trolleys 5' and trays 50' for said lift trolleys.

The racks 5 are shown in detail in FIGS. 5 to 8. They are on legs and of the nesting type. Each rack 5 has a tray 50 adapted in size to carry a single parcel 2. The tray 50 is secured to a frame carried by wheels 51. The frame has two vertical members 52 that are secured at their bottom ends to two horizontal members 53 that are mutually parallel and that are provided with wheels 51.

The racks 5 are of mutually different heights and widths. In the example shown, the racks 5 thus have three different formats (height-width pairs): small format, medium format, and large format.

Figures 7, 8:
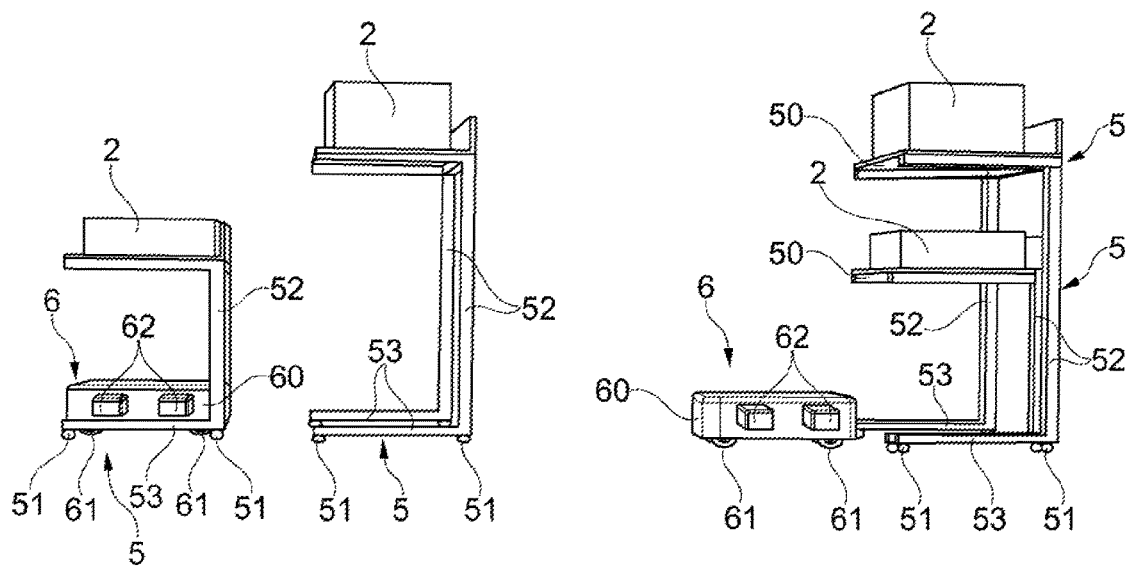

In addition, under the tray 50, the frame does not have any cross-member interconnecting the vertical members 52 or the horizontal members 53. Thus, and as shown in FIGS. 7 and 8, a rack 5 of small format or of medium format can fit under a rack 5 of medium format or of large format, under which it can be stowed.

It is thus possible to stow racks 5 of different formats at the same place. In the example, shown, three racks 5, each having a respective one of the three formats that is different from the other two, can be stowed at the same location, nested and superposed relative to one another.

In addition, the shuttle robot carts (or motor-driven shuttle carts) described below are designed to be suitable for fitting under all of the racks 5, regardless of the format of each rack 5.

When they are not being stored in the parking zone 13, the racks 5 can be waiting in the stowage zone 11 or be traveling around the platform 10.

In the example shown, the racks 5 are intrinsically movable by means of their wheels 51.

The shuttle carts 6 of the center are, for example, stored in the parking zone 13 with the racks 5 or in any other parking zone or maintenance zone. When they are not being stored, the shuttle carts 6 are traveling around the platform 10. The width of the shuttle cart 6 is less than the distance between the horizontal members 53 of the rack 5 of small format.

Figures 5, 6:
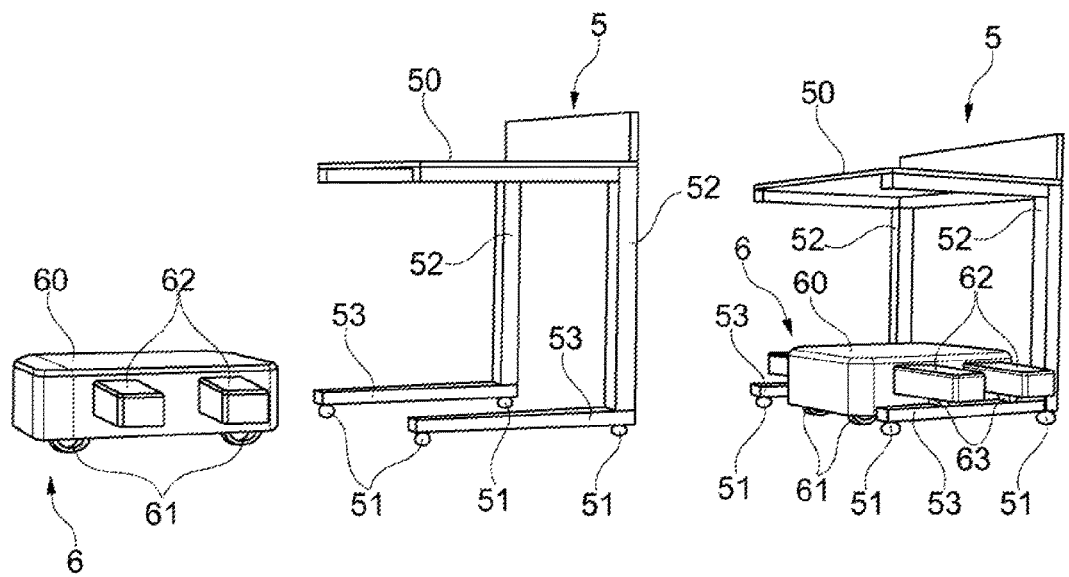
FIGS. 5 to 8 show how a shuttle robot cart is used with a nesting-type rack.

Thus, and as shown in FIGS. 6 and 7, the shuttle cart 6 can fit between the horizontal members 53 of each rack 5, regardless of whether or not said rack is carrying a parcel 2, and regardless of its format.

As shown in detail in FIGS. 5 to 8, each shuttle cart 6 has a motor unit 60 carried by driven wheels 61 controlled by a monitoring and control central processing unit 7 that is described below.

The motor unit 60 also has arms 62 that are extensible laterally from the motor unit 60 and that are caused to be deployed by the monitoring and control central processing unit 7.

Said arms 62 are provided with grasping means 63 (visible to some extent in FIG. 6) suitable for fastening onto the horizontal members 53 of the racks 5.

These grasping means 63 are, for example, magnetic means that co-operate with metal horizontal members 53 of the racks 5.

In addition, the arms 62 can be deployed above the horizontal members 53 and over a length sufficient to reach the horizontal members 53 of the rack 5 of large format. Thus, the arms 62 can accommodate the various widths of the racks 5 and can dock with a single rack 5 or with a plurality of racks 5 of different formats simultaneously. Each shuttle cart 6 is independently self-propelled and is provided with positioning sensors, a power supply, and a computer enabling it, in particular, to optimize its movements and to avoid collisions with obstacles and with other shuttle carts 6. The shuttle carts 6 are individually controlled remotely by the monitoring and control central processing unit 7 shown diagrammatically in FIGS. 1 and 2, and operation of which is described below.

Figure 11:
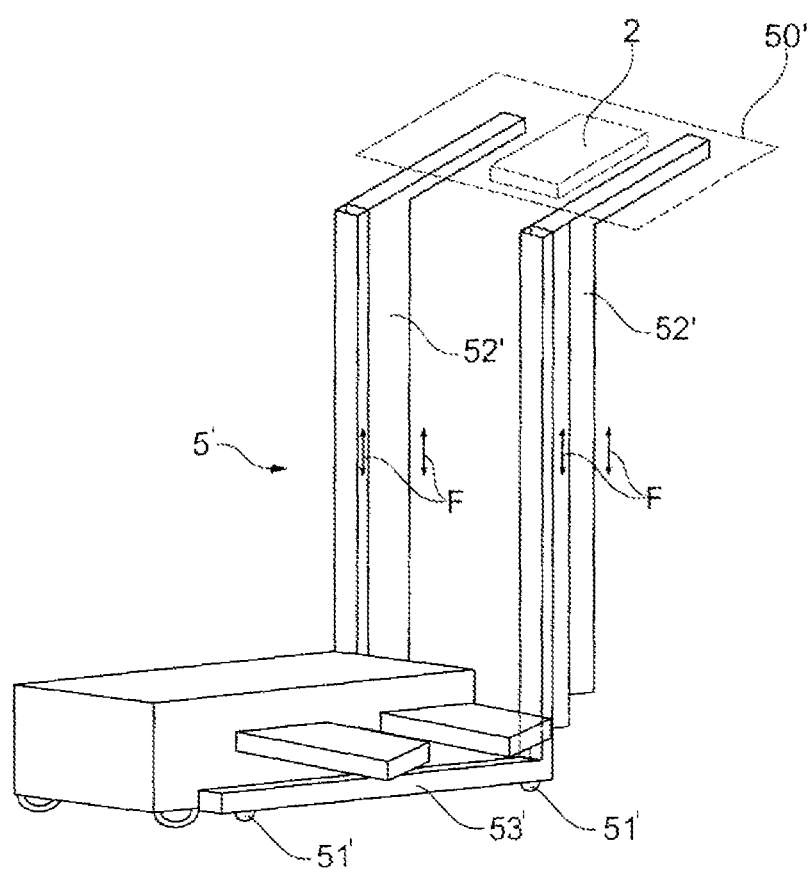
FIG. 11 shows a lift trolley of the invention.

In accordance with the invention, the center further includes lift trolleys 5' that carry trays 50'. FIG. 11 shows such a lift trolley 5' that, in this example, comprises a frame carried by wheels 51'. The frame has two vertical members 52' that are upwardly telescopic (as shown by the arrows F) and that are secured at their bottom ends to two horizontal members 53' that are mutually parallel and that are provided with wheels 51'.

Each telescopic member 52' may, for example, be made up of a plurality of parallel bars that slide one in the other to generate the telescopic effect.

The free ends of the vertical members 52' are arranged to carry a removable tray 50' in flat manner. Said free ends may, for example, be designed to form a horizontal fork that passes under the tray 50'.

The center 1 may be equipped with a plurality of lift trolleys 5' and with a multitude of trays 50' that are of the same dimension, that are interchangeable, and that may be stored in the parking zone 13. As shown in FIG. 11, the horizontal members 53' of the frame of a lift trolley 5' are spaced apart from each other so that a shuttle cart 6 can dock with them in the same way as with a nesting rack 5. The spacing between the horizontal uprights may be smaller than the spacing provided between two horizontal members 53 of the smallest nesting rack.

The vertical members 52' of a lift trolley 5' may be deployed by an electric or hydraulic transmission that is controlled from the shuttle cart 6 docking with the lift trolley.

The center 1 of the invention further includes an identification zone 14 (visible in FIG. 1) at which the unloaded parcels 2 are identified. The identification may be performed in contactless manner, e.g. by reading a bar code on the parcel. The bar code may be a parcel identifier that identifies the parcel and that is recorded in a memory of a database in correspondence with other information on the parcel, such as a delivery address, three-dimensional (3D) characteristics (height, width, and length), a weight, etc.

The format of the rack 5 carrying the parcel 2 may also be detected at this identification zone 14, or determined earlier by any suitable means. In addition, the racks 5 may also be identified uniquely. The identity of each rack 5, in addition to its format, may then be detected at said identification zone 14.

The center 1 of the invention includes a monitoring and control central processing unit 7 suitable for supervising operation of the center 1 and in particular for remotely controlling the movements of the shuttle carts 6. Said unit 7 uses the database relating to the characteristics of the parcels. The central processing unit 7 is also suitable for receiving information relating to identifying the racks 5 used, to the destinations of the parcels 2, and to the positioning of each shuttle cart 6. Having the movements of the shuttle carts 6 managed by the central processing unit 7 makes it possible to optimize their traffic and to avoid any collision.

The central processing unit 7 has a sorting plan for sorting the parcels for shipping them, which plan distributes the parcels in the stowage zone 11 both over the segments 12 and heightwise with the nesting racks and the tray racks 12'.

On the basis of the sorting information collected in the identification zone 14 on the destinations of the unloaded parcels 2, the central processing unit 7 organizes the stowage of the racks 5 in the segments 12 of the stowage zone 11 and also the superposition of the trays above the racks 5 in the tray rack(s) 12'.

Once all of the parcels 2 have been stowed and sequenced in the stowage zone 11, the central processing unit 7 organizes recovery of them following an ordered sequence so as to optimize, for example, the loading of the trucks 4 with a view to delivering the parcels in said ordered sequence.

The center 1 of the invention may include a service zone 15 at which the parcels 2 may, optionally, be weighed, labeled, or repaired. As described in detail below, the parcels 2 are conveyed to the service zone 15 by being carried by a rack 5 that is motor-driven by a shuttle cart 6, or by a lift trolley 5' having a tray 50' and that is motor-driven by a shuttle cart 6. A security inspection of the parcels 2 may also be performed at the service zone 15.

The center 1 of the invention makes it possible to implement the method of handling parcels 2 that is described below, while optimizing the stowage in the stowage zone 11, and while optimizing the loading of the parcels 2 in the trucks 4 with a view to delivering them.

The handling method of the invention starts with the arrival of a parcel 2, e.g. brought by a truck 4 and unloaded at one of the unloading points 3.

Arrival of the truck 4 can be detected automatically by any known means, or indicated by the handling employee, e.g. by means of a switch (not shown) provided for this purpose at the unloading point 3.

Figure 3:
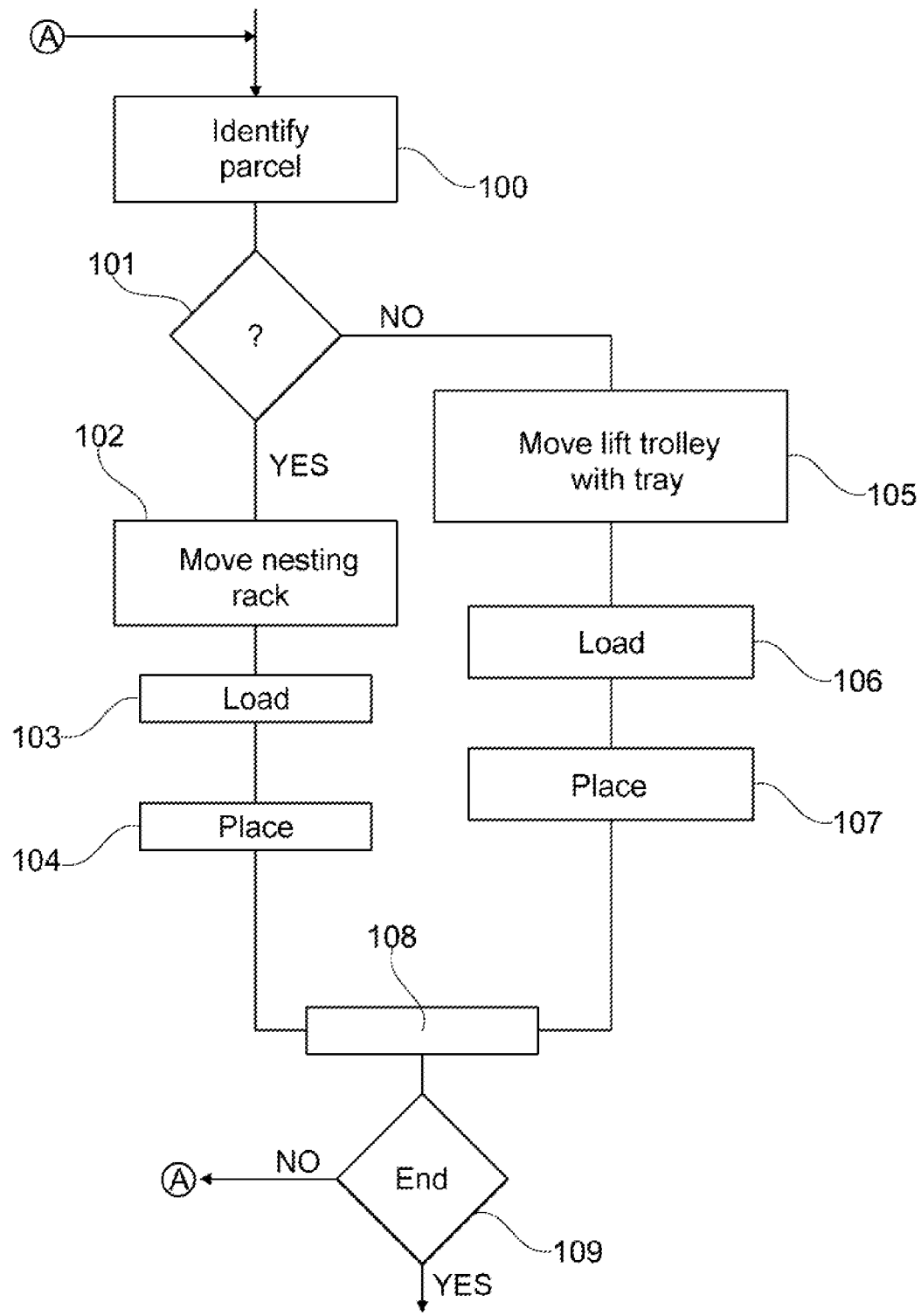
FIGS. 3 and 4 are flow charts showing the steps in the parcel handling method of the invention.

As indicated by FIG. 3, the process starts at 100. The parcel 2 is identified and its identification code is transmitted to the central processing unit 7.

After this identification, the unit 7 detects at 101 whether the parcel 2 is a parcel of the type to be placed on a nesting rack or a parcel to be placed on a tray of a lift trolley. Other information may be retrieved such as the dimensions of the parcel (height, width, length), weight, delivery address, etc.

In accordance with the invention, the nesting racks are reserved for heavy parcels or for very voluminous parcels, e.g. having a height greater than 20 centimeters (cm). The smaller and lighter other parcels are moved by lift trolley.

In accordance with the invention, the small parcels placed on trays 50' moved by lift trolley are stored in the upper portion of a tray rack 12' as shown in FIG. 9, while the large parcels on nesting racks are stored on the floor, and possibly in the lower portion of a tray rack.

FIG. 9 shows a tray rack 12' with, in the upper portion, a superposition of runners 60' that are spaced apart at a small pitch and that are without trays. FIG. 9 also shows three trays 50' with three small parcels 2 and that are superposed in the upper portion of the tray rack 12'.

It can be understood that, using a lift trolley 5', it is possible to bring a parcel 2 placed on a tray 50' to a desired height and to insert the tray onto the runners 60' for storage in the tray rack. Inserting the tray 50' into the rack 12' may take place by advancing the lift trolley towards the rack 12' or indeed by a telescopic effect of the fork of the lift trolley. Removing a tray 50' from the rack 12 may also take place by reversing the lift trolley away from the rack or indeed by a telescopic effect of the fork of the lift trolley.

In accordance with the invention, a tray rack 12' may have a height above the floor of several meters, and thus a high capacity for storing trays 50'.

As shown in FIG. 9, the rack has two sides spaced apart by a distance sufficient for a nesting rack of the largest size to be inserted on the floor between said two sides. In the lower portion of the tray rack 12', FIG. 9 also shows three nested nesting racks with large parcels that are superposed on one another. With this tray rack and with the nesting racks, the footprint on the floor is optimized.

At 102, a nesting rack 5 is brought by shuttle robot cart to the unloading point 3. At 103, a large parcel is loaded by the operator onto the nesting rack, and, at 104, the shuttle robot cart moves the nesting rack with the parcel 2 to the stowage zone 13. This stowage zone may correspond to the lower portion of a tray rack. The location of the stowage (choice of the segment in the zone 13) is computed by the unit 7 based on the sorting plan and on the characteristics of the parcel. Then at 108 the shuttle robot cart releases the nesting rack and returns, for example, to the parking zone 13.

At 105, a lift trolley 5' with an empty tray 50' is brought by shuttle robot cart to the unloading point. At 106, a small parcel is placed by the operator on the tray 50'. At 107, the resulting assembly is brought by the shuttle robot cart to the stowage zone 13. On the basis of the sorting plan and of the parameters of the parcel, and also of a history of the storage of the parcels in the tray racks, the shuttle robot cart 6, as controlled by the unit 7, actuates the lift trolley so as to present the tray 50' dynamically at a height adjusted with a view to inserting it into a rack 12', with space being optimized as a function of the parcel placed immediately below. In particular, the empty space between two trays 50' in a rack is minimized by the unit 7. Then, at 108, the shuttle robot cart with the lift trolley releases the tray 50' into the rack and returns to the parking zone 13.

The process loops back to step 100 until there are no more parcels to be stowed at 109.

As can be understood, the unit 7 keeps in a memory a distribution of the parcels in the stowage zone 11, be it in the segments 12 or in the tray racks 12'.

Once all of the parcels 2 have been sorted into the stowage zone 11, the parcels can be retrieved from said zone and loaded into the trucks with a view to shipping them and delivering them.

Figure 4:
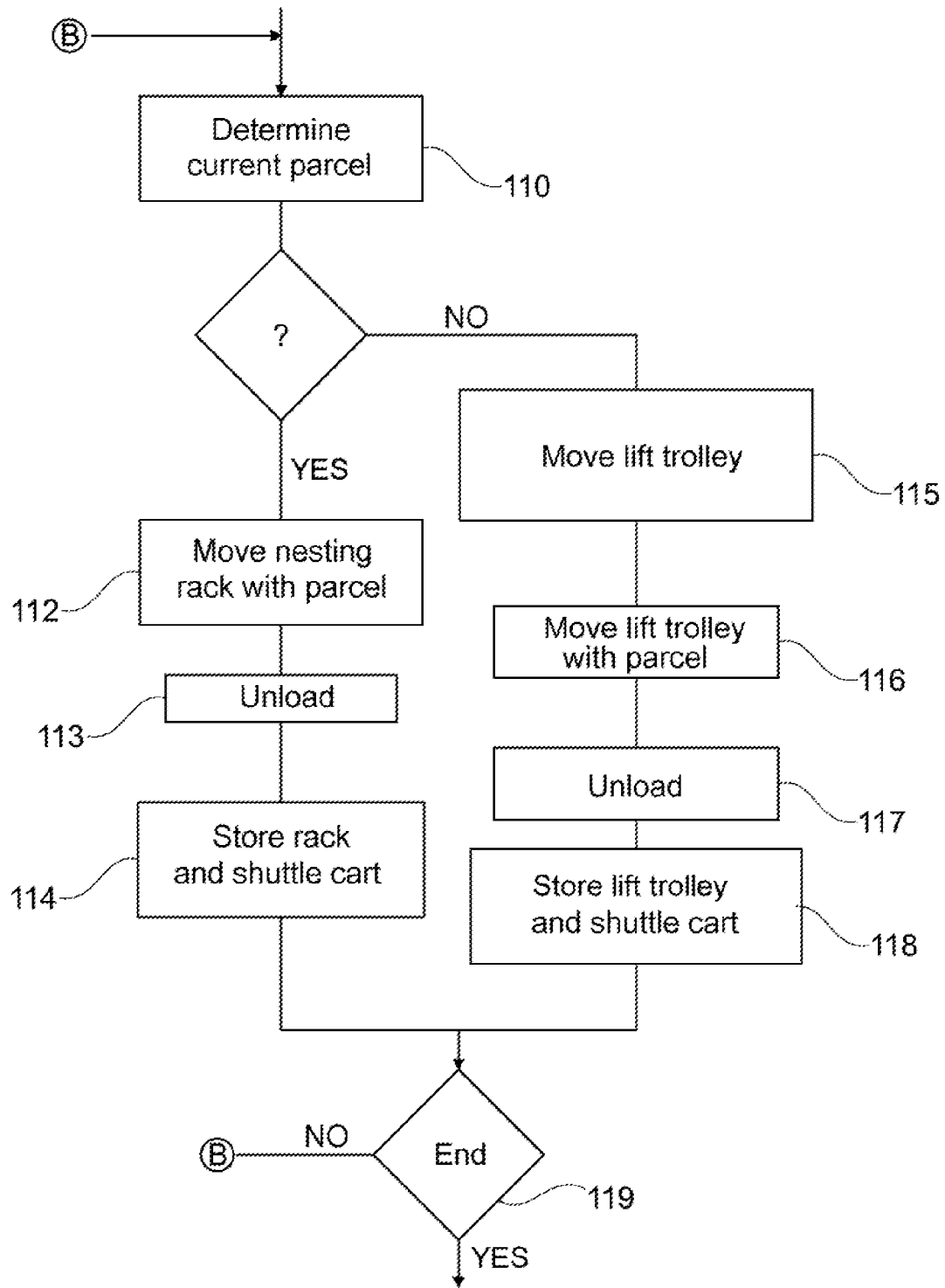

The loading can be performed immediately after the process of FIG. 3 or after a waiting time. For this purpose, the central processing unit 7 assigns a group of shuttle carts 6 to loading the parcels for each destination into one or more trucks 4 and organizes and determines a loading sequence in step 110 in FIG. 4 in such a manner that the trucks 4 are loaded in the delivery sequence for each shipment.

At 111, a type of parcel for the current parcel is thus determined by the unit 7 (large parcel on nesting rack, or small parcel on tray).

At 112, it is a large parcel. A shuttle cart takes the nesting rack and brings it to the loading point 3. The operator unloads the parcel from the nesting rack at 113, and at 114 the shuttle cart with the nesting rack returns to the parking zone 13.

At 115, it is a small parcel. A shuttle cart arrives in the stowage zone with a lift trolley. The tray 50' is taken hold of by the fork of the lift trolley (adjusted heightwise) with the small parcel in the rack 124. The shuttle cart brings the resulting assembly to the loading point 3. The operator unloads the small parcel at 117 and the shuttle cart goes back to the parking zone 13 with the lift trolley and the tray. If, at 119, there are no more parcels to be loaded onto the truck(s), the process stops. Otherwise, it loops backs to step 110.

With this arrangement, each time a tray with a parcel is inserted into a rack, the unit 7 is suitable for dynamically adjusting the height at which the tray is inserted in order to leave as little space as possible between said tray and the adjacent tray below in the rack. The tray racks may be disposed in rows, i.e. one row per segment. It is possible to have a plurality of rack aisles and also segments without tray racks depending on the particular features of the parcel sorting to be performed. But it can be understood that with this arrangement a high density of vertical storage is obtained for storing the parcels. The tray racks may be wheeled, i.e. they may have wheels like the nesting racks or the lift trolleys. The tray racks may be designed to be docked and moved by the shuttle robot carts, so that any placement in the stowage zone 11 of the logistics center can be performed by the shuttle robot carts. It is possible for the stowage zone to be reconfigured automatically.

Naturally, the present invention is in no way limited to the above description of one of its implementations, which can undergo modifications without going beyond the ambit of the invention.

The invention claimed is:

1. A method of handling articles in a logistics center having an unloading zone for unloading the articles arriving at the center and an article stowage zone where the articles arriving at the center are stored in an ordered manner, in order to be transported in a predetermined sequential manner when they leave the center, the method comprising:
   moving articles from the unloading zone to the stowage zone with a plurality of shuttle robot carts, the shuttle robot carts being configured to couple with nesting racks and lift trolleys,
   moving articles from the unloading zone to the stowage zone with the nesting racks coupled to the shuttle robot carts, and
   storing the trays loaded with the articles in superposed manner in the stowage zone on at least one vertical tray rack, wherein if an article is loaded on a nesting rack in the unloading zone, the shuttle robot cart stores the article with the nesting rack in a lower portion of the tray rack, and
   if an article is loaded on a tray placed on the lift trolleys, the shuttle robot cart stores the article with the tray carried by the lift trolley above the nesting rack in an upper portion of the tray rack that is provided with horizontal runners.

2. A method according to claim 1, wherein storing includes using the shuttle robots to actuate the lift trolleys in a manner that positions the trays dynamically and heightwise above one another in the tray rack to minimize empty space between two consecutive trays.

3. A method according to claim 1, wherein storing the trays includes using a plurality of tray racks disposed in one or more rows in the stowage zone.

4. A method according to claim 1, wherein the articles are parcels.

5. A logistics center for handling parcels, which logistics center comprises:
   a loading/unloading point for loading/unloading the parcels and a stowage zone that is designed for receiving parcels that are waiting for loading, said loading/unloading point is subdivided into various segments, each of which corresponds to a shipment of said parcels,
   a plurality of nesting racks of different height and width formats configured for nesting by being superposed on one another,
   a plurality of independently, self-propelled motor-driven shuttle carts, each shuttle cart being configured to dock with a nesting rack loaded with parcels under the control of a central processing unit,
   lift trolleys for carrying trays and for docking with the shuttle carts, and
   one or more tray racks, each tray rack having a lower portion suitable for storing the nesting rack loaded with parcels, and an upper portion for storing the trays loaded with parcels carried by the lift trolleys, said trays being stored above the nesting rack.

6. A logistics center according to claim 5, wherein the tray racks are wheeled.

7. A logistics center according to claim 6, wherein the wheeled tray racks are arranged to be docked with and moved by a shuttle cart.

* * * * *